(12) United States Patent
Chance

(10) Patent No.: US 8,746,643 B2
(45) Date of Patent: Jun. 10, 2014

(54) GRATE DEVICE AND METHOD FOR STORING A BARBECUE GRILL

(76) Inventor: Michael Chance, Suwanee, GA (US)

( * ) Notice: Subject to any disclaimer, the term of this patent is extended or adjusted under 35 U.S.C. 154(b) by 44 days.

(21) Appl. No.: 13/441,220

(22) Filed: Apr. 6, 2012

(65) Prior Publication Data

US 2013/0264445 A1   Oct. 10, 2013

(51) Int. Cl.
    *A47H 1/16*   (2006.01)
(52) U.S. Cl.
    USPC ........... 248/302; 248/153; 248/175; 248/249; 126/152 R; 211/181.1; 211/119; 211/85.31; D7/409
(58) Field of Classification Search
    USPC ........... 248/465.1, 107, 112, 153, 175, 218.1, 248/249, 302; 211/181.1, 133.2, 133.5, 211/119.008, 119.004, 119, 90.03, 85.31; 126/152 R, 152 B; 220/744, 694, 628; D7/334, 335, 402, 403, 409
    See application file for complete search history.

(56) References Cited

U.S. PATENT DOCUMENTS

| | | | | |
|---|---|---|---|---|
| 762,179 A | * | 6/1904 | Maxam | 248/215 |
| 1,417,215 A | * | 5/1922 | Syrett | 126/332 |
| 2,678,184 A | * | 5/1954 | Erdody | 248/311.2 |
| 3,429,541 A | * | 2/1969 | Herman | 248/302 |
| 4,638,786 A | | 1/1987 | Lucky | |
| 4,773,660 A | * | 9/1988 | Trubiano | 280/33.994 |
| 4,775,124 A | * | 10/1988 | Hicks | 248/175 |
| D301,673 S | * | 6/1989 | Ogden | D7/402 |
| D399,415 S | * | 10/1998 | Gay | D8/370 |
| 5,961,181 A | * | 10/1999 | Salehi et al. | 297/188.04 |
| 6,298,843 B1 | | 10/2001 | Olsen | |
| 6,619,609 B2 | * | 9/2003 | Cress | 248/447 |
| D528,847 S | * | 9/2006 | Chung | D7/334 |
| 7,344,173 B2 | | 3/2008 | Gonzalez | |
| D618,035 S | * | 6/2010 | Chung | D7/334 |
| 2007/0075210 A1 | * | 4/2007 | Yang | 248/465.1 |

* cited by examiner

*Primary Examiner* — Terrell McKinnon
*Assistant Examiner* — Michael McDuffie
(74) *Attorney, Agent, or Firm* — J.T. Hollin, Attorney at Law, P.C.

(57) ABSTRACT

The inventive concept disclosed comprises a storage grate for grills of the type typically used in outdoor barbecue grills and particularly, kamado-style grills. The device is essentially a one-piece rod having been bent and formed into specific angles and segments, thereby allowing the device to be attached onto an outdoor cooking grill or kamado-style charcoal cooking grill as is marketed by many commercial brands. The device serves the purpose of short-term or long-term retention and storage of the grill used in the cooking process prior to, or after use of the grill for cooking.

5 Claims, 3 Drawing Sheets

GRATE DEVICE AND METHOD FOR STORING A BARBECUE GRILL

CROSS-REFERENCES TO RELATED APPLICATIONS

None

STATEMENT REGARDING FEDERALLY SPONSORED RESEARCH OR DEVELOPMENT

Not applicable.

NAMES OF THE PARTIES TO A JOINT RESEARCH AGREEMENT

Not applicable.

REFERENCE TO A "SEQUENCE LISTING," A TABLE, OR A COMPUTER PROGRAM LISTING APPENDIX

Not applicable.

BACKGROUND OF THE INVENTION (1) Field of the Invention

The inventive concept herein relates to equipment, utensils, and accessories frequently used in outdoor cooking, particularly grilling, smoking, or barbequing of fresh meats or vegetables. The inventive concept herein generally is particularly suitable for the handling and storage of grill tops that are used over outdoor cooking equipment. Specifically, the preferred embodiment of the device described herein is a convenient grate device for retaining a grill near the apparatus which contains the heat source or combustible materials. The preferred embodiment of the grate disclosed herein is used in conjunction with kamado-style cooking grills with legs within or upon which the grate may be attached or inserted.

(2) Description of the Related Art, Including Information Disclosed Under 37 CFR 1.97 and 1.98

The following documents are illustrative of similar mechanisms used for outdoor cooking:

In U.S. Pat. No. 6,298,843 (Oct. 9, 2001) presented is an outdoor cooking apparatus including an elongate support assembly with a tubular member having a bore extending therethrough with elongate support assembly being adapted to penetrate the ground for above-ground extension. Also included is a grill support assembly having a cable being adjustably extended through the bore of the tubular member. The device further includes a grill assembly including a grill member being suspended above the ground by the cable.

U.S. Pat. No. 4,638,786 (Jan. 27, 1987) discloses a magnetic utensil-holder having a first ring with magnets therein that are placed on a cooking surface, such as a stove top or grill, surrounding a heat source. A second ring is spaced a predetermined distance above the first ring by a plurality of support means. A cooking utensil is placed inside of the holder and a plurality of adjustment means are adjusted until they contact the cooking utensil. The cooking utensil is thus held firmly on the cooking surface. Extension pins extend above the second ring to prevent pot lids from sliding off. Further, joinder bars co-act with the extension pins to fasten two such magnetic utensil-holders together.

U.S. Pat. No. 7,344,173 (Mar. 18, 2008) shows removable handles for use with a cooking utensil. In the preferred embodiment, the cooking utensil is a griddle which is intended for use on a grill to provide for the frying of foods. The removable handles are put into or out of engagement with a griddle, and have downwardly extending legs which elevate and support the griddle when placed on a flat surface. It is intended that the handles be removed from the griddle during the period of time that the griddle is used for cooking, such that the handles and leg supports always remain cook. Thus, when the food is cooked, the griddle can be removed from the grill using the handles without the use of oven mitts.

BRIEF SUMMARY OF THE INVENTION

The inventive concept disclosed comprises a one-piece rod which has been bent or formed into specific angles and segments so as to enable a fit onto a Kamado-style charcoal cooking apparatus as is found in many commercial brands. The preferred embodiment of this inventive concept is particularly suitable for use while cooking with small, medium, and large sizes of The Big Green Egg, a ceramic charcoal grill. The device serves the purpose of temporary or long-term retention and/or storage of the grill used in the cooking process prior to, or after use of the grill.

DETAILED DESCRIPTION OF THE INVENTION

The grate 1 disclosed herein is manufactured from a single continuous rod of a specified length, "L." In the preferred embodiment, the rod comprises a suitable metal with a diameter in the range of 3/16 to 3/8 inch. The length, "L" may be in the range of thirty-six (36) to fifty-four (54) inches. Other metals or composite materials of suitable rigidity and high temperature tolerance may also be used. In the fabrication process, the rod is bent and shaped into a plurality of symmetrical left and right segments which comprise essentially four intersecting planes, 34, 35, 36, and 37, which are shown by their respective dashed lines in FIG. 1 and FIG. 2.

Figure 1:
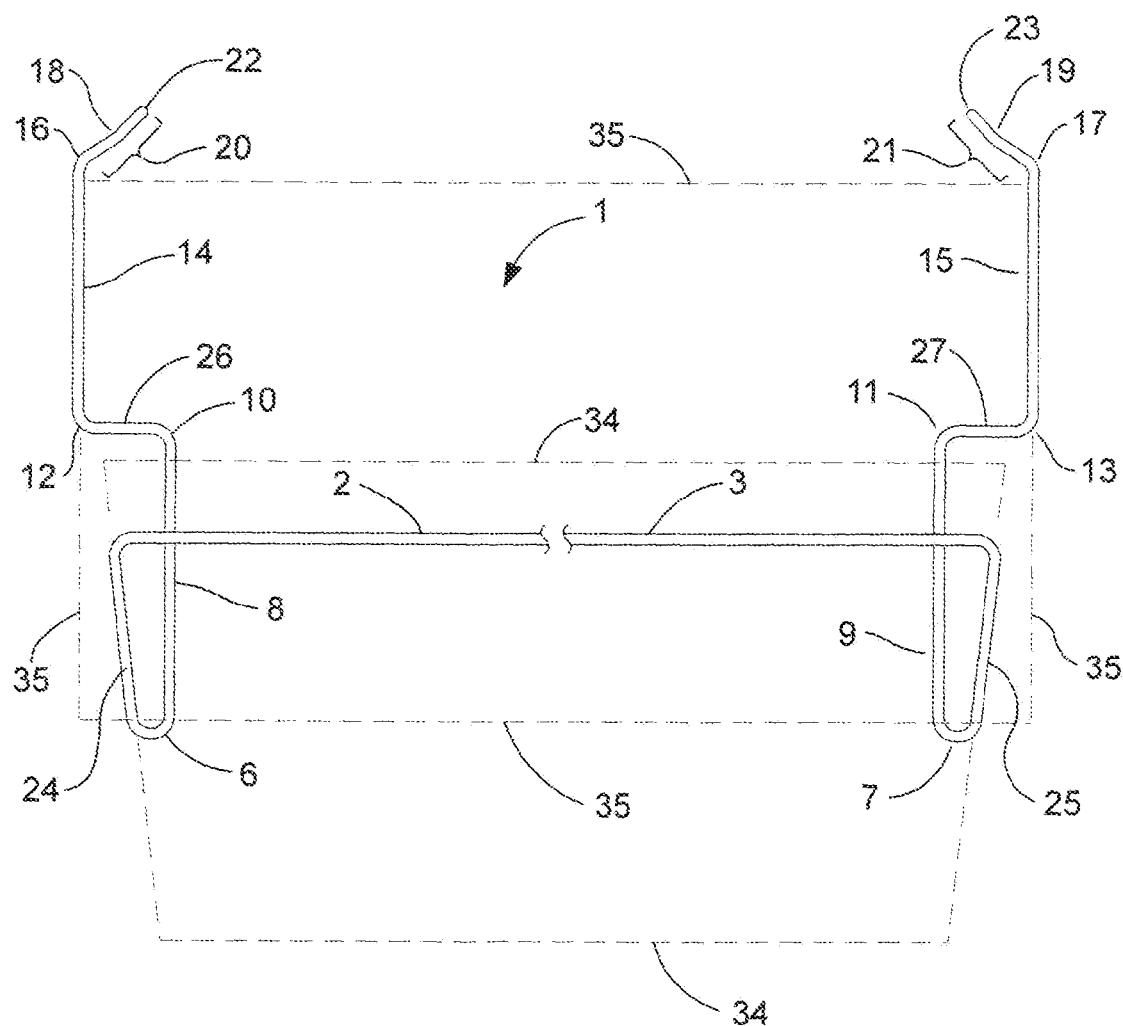
FIG. 1 is a "head-on" view of the front of the grate, (with a graphic separation of the grate left half and right half cross-members), and further indicating the first and second planes encompassing certain segments of the grate.

Beginning with FIG. 1, there is shown a head-on view of the grate 1 device wherein the left-half cross-member 2 and the right half cross-member 3 are shown separated near midpoint of the entirety of the cross-member to more accurately portray the proportions of the grate 1. The left half cross-member 2 and the right half cross-member 3 are respectively bent downward ninety degrees to form a left incline 24 and a right incline 25 segment, with both inclines 24, 25 comprising a first plane 34.

Figure 4:
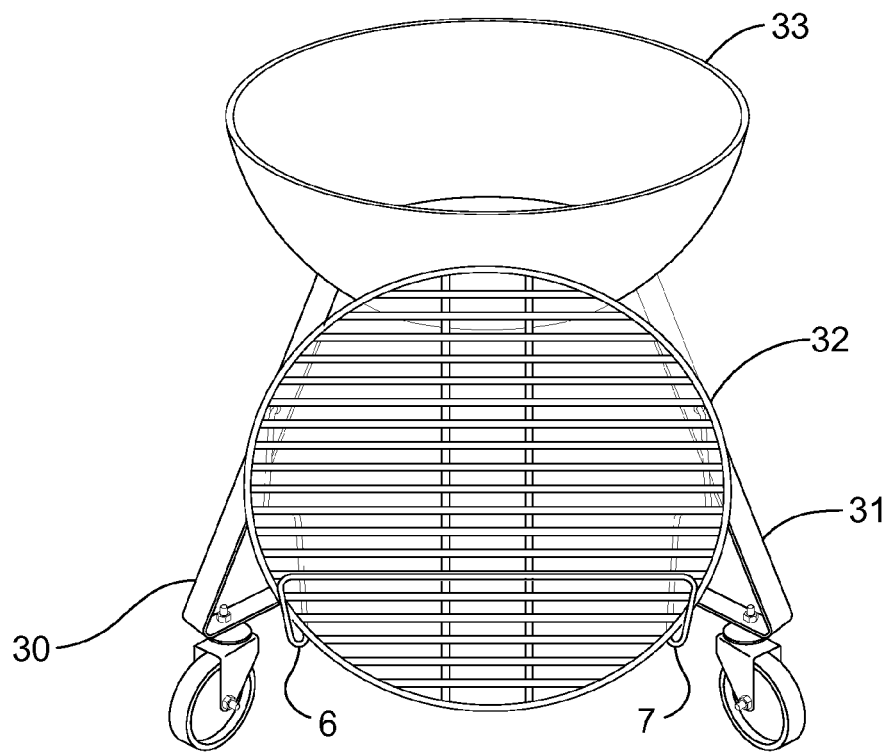
FIG. 4 illustrates a typical barbeque grill stored between the elbows of the grate, with the grate attached to the legs of the cooking device.

At the lower ends of each incline 24, 25 a left elbow 6 and a right elbow 7 are formed with upward bends, creating a left lower arm 8 and a right lower arm 9, which define a second plane 35. The left incline 24 and the right incline 25, form additional support for insertion of a barbecue grill between the elbows 6, 7, as shown in FIG. 4. Again referring to FIG. 1, there is shown extending upward from the left elbow 6 and the right elbow 7 a left lower arm 8 segment and a right lower arm 9, segment, respectively.

Figure 2:
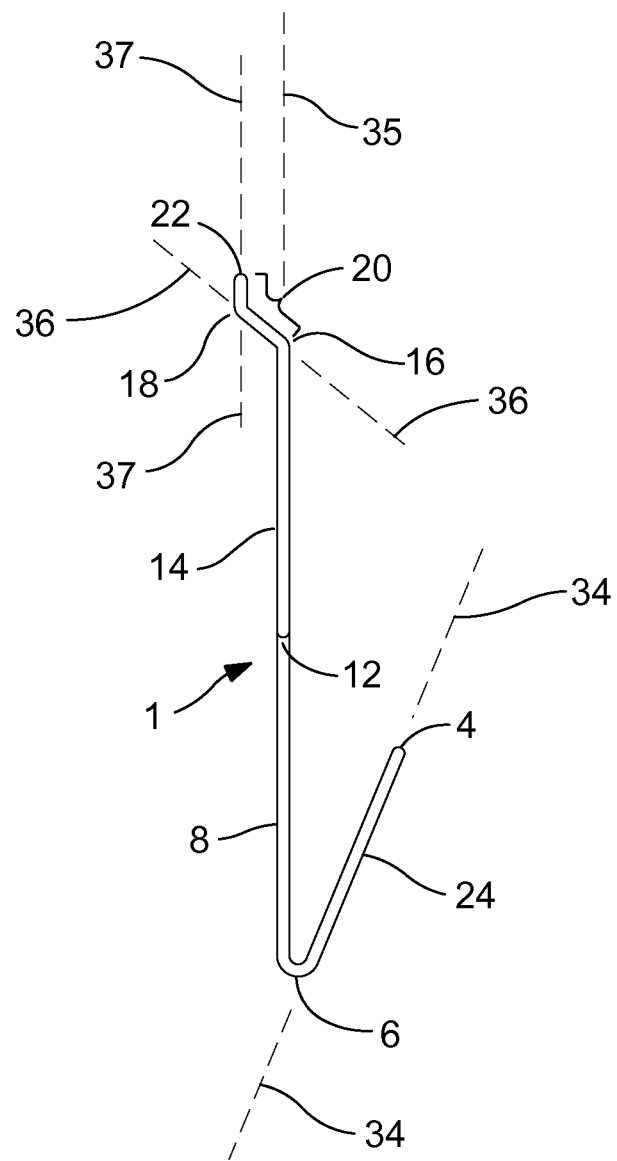
FIG. 2 is a view of the left side of the grate, further indicating the four planes which encompass particular segments of the device.

In order to provide a larger resting surface for a grill, the lower arms 8, 9 are bent at a left outward bend 10 and a right outward bend 11, thereby forming a left wing 26 segment and a right wing 27 segment. In turn, the wings 26, 27 are bent at a left upward bend 12 and a right upward bend 13, respectively, thereby forming a left upper arm 14 and a right upper arm 15. The above-mentioned segments are illustrated in FIG. 1, while FIG. 2 depicts the segments of the left side of the grate 1.

In making provision for attachment of the grate 1 to the support legs 30, 31, or body of a cooking apparatus 33, a left short bend 16 and a right short bend 17 are formed at a forty-five degree angle, emanating respectively from the left upper arm 14 and right upper arm 15. The two short bends 16, 17, comprise a third plane 36 as shown in FIG. 2.

The result of the two short bends is two relatively short segments, a left finger 20 and a right finger 21. Each respective finger 20, 21 is characterized by a forty-five degree upward left jog 18 and a forty-five degree upward right jog 19. The left and right jogs 18, 19, together define a fourth plane 37. Each jog then terminates in a left tip 22 and a right tip 23, respectively. Each tip 22, 23, also corresponds with the opposite terminal ends of the rod length, L.

Figure 3:
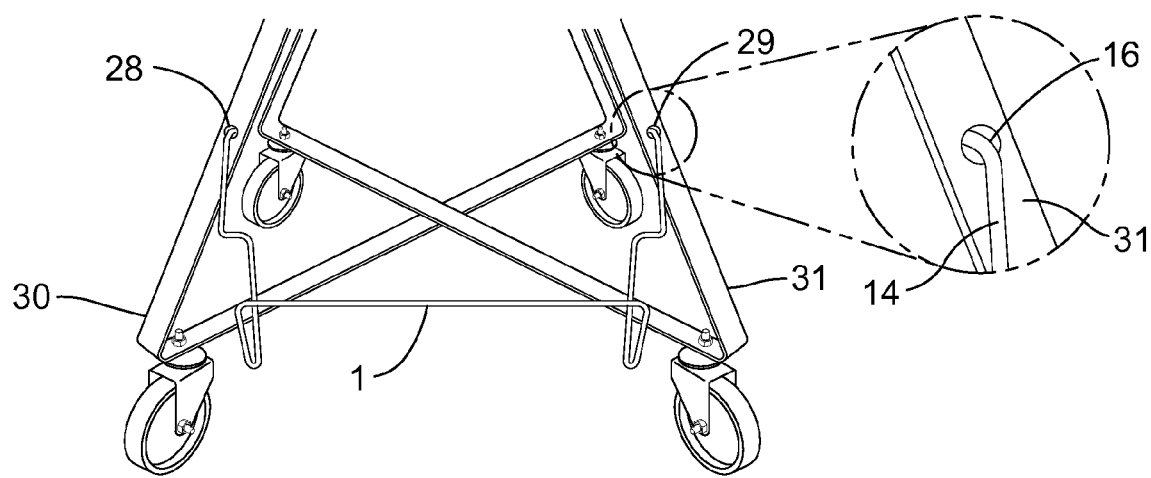
FIG. 3 presents the grate device attached to the support legs of an outdoor cooking apparatus.

To attach the grate 1 to a cooking apparatus 33, each tip 22, 23, is inserted into a left hole 28 and a right hole 29, each hole being either preformed or drilled, preferably into two of the legs 31, 32 of the cooking apparatus 33. FIG. 3 illustrates such an insertion into a cooking apparatus 33. The respective left and right jogs 18, 19 provide a degree of leverage to secure the fit and retention of the fingers 20, 21 of the grate 1 within the aforesaid holes 28, 29 of the cooking apparatus 33 shown. FIG. 4 depicts a typical cooking grill 33 stored on the grate 1.

It is also pointed out that, in lieu of the combination of the fingers 20, 21 and jogs 18, 19, the respective finger segments 20, 21 and/or tips 22, 23 of the rod may be flattened and eyeholes drilled into the respective flattened surfaces, thereby providing a means for using sheet metal screws, or other types of screws to fasten the grate 1 onto the cooking apparatus 33, or the legs of most outdoor cooking grills.

While embodiments of the present inventive concept may be disclosed herein, it will be obvious to those persons skilled in the art that such embodiments are presented by way of example only, and not as a limitation to the scope of the inventive concept. Numerous variations, changes, and substitutions may occur or be suggested to those skilled in the art without departing from the intent, scope, and totality of this inventive concept. Accordingly, it is intended that this inventive concept be inclusive of such variations, changes, and substitutions, and by no means limited by the scope of the claims presented herein.

What is claimed is:

1. A grate device for the retention and storage of a grill of the type utilized with a komado-style cooking apparatus, said grate attachable to the body or support legs of said cooking apparatus, and further comprising a continuous, specified length, "L," of rod, having a diameter in the range of 3/16 to 3/8 inch, said rod further bent into a plurality of left and right symmetrical segments, said segments forming essentially four adjoining planes, wherein said first plane is defined beginning at the midpoint of said rod, and while said rod is positioned in a horizontal orientation, starting at locations on said rod 0.15L left of said midpoint and 0.15L right of said midpoint, forming a ninety degree downward corner bend at both locations, such that both said bends form a horizontal cross-member, and left and right inclined segments, respectively, the three segments forming said first plane;

said second plane defined beginning at locations on said inclined segments, 0.075L from each said corner bend, having an elbow bend in the range of a thirty to forty degree angle, whereby both of said elbow bends form left and right lower arms, with said lower arms forming a common second plane, said second plane being inclined at a thirty-to-forty degree angle from said first plane;

said second plane is further defined beginning at locations on said left and right lower arms, 0.10L from each said elbow bend, having a ninety degree outward bend in a direction away from each said elbow bend, said outward bends thereby forming a left wing segment and right wing segment, respectively, both said segments occupying said second plane;

said second plane further defined beginning at locations on said left wing and said right wing, 0.025L from each said outward bend, wherein a ninety degree upward bend, is formed, creating a left upper arm and a right upper arm, respectively, both said upper arms contained within said second plane;

said third plane is defined beginning at locations on said upper arms, 0.075L from each upward bend, therein having a forty-five degree knuckle bend oriented at forty-five degrees from said second plane and with each of said knuckle bends thereby forming a left jog and a right jog, respectively, oriented orthogonally to each other in a common third plane; and said fourth plane is defined starting at locations on said left and right jogs, 0.0125L from each knuckle bend, therein having a forty-five degree bend oriented at forty-five degrees to said left and right jogs, respectively, thereby forming left and right fingers, both of said fingers occupying a common fourth plane and terminating in a tip of each said finger, with, the opposite ends of said rod terminating at the respective left and right tips, respectively, of said fingers.

2. A grate device as in claim 1, further comprising flattened left and right tips, such as to provide for a left eyehole opening and a right eyehole opening drilled into said left and right tips, respectively, thereby allowing insertion of screws through said eyehole openings as a means for fastening said grate device to the body or support legs of a cooking apparatus.

3. A grate device for the retention and storage of a grill of the type utilized with a komado-style cooking apparatus, said grate attachable to the body or support legs of said cooking apparatus, said grate device comprising a rod, of continuous, specified length, "L," having a diameter in the range of 3/16 to 3/8 inch, said rod being bent into a plurality of left and right symmetrical segments, said segments comprising a horizontal cross-member having a length of 0.30L and having a left half and a right half and further terminating in two ninety degree downward corner bends;

a left and a right inclined segment each of length 0.075L, emanating from said left and right downward corner bends, respectively;

a left and right elbow bend commencing from the end of said left and right inclined segment;

a left and right lower arm segment, each such segment emanating from said left and right elbow bends respectively and being a length of 0.01L, further, each left and right lower arm segment being oriented at a thirty-to-forty degree angle from said respective inclined segments;

a left and right ninety degree outward bend in an outward direction away from each said elbow bend, said outward bends thereby forming a left wing segment and right wing segment, each wing of a length 0.025L;

a left upper arm and a right upper arm, respectively, each of said upper arms having a length of 0.075L;

a left short bend and a right short bend, both oriented at a forty-five degree inward bend toward said cross-member, thereby forming a left finger and a right finger, each of said fingers being of a length equal to 0.0125L;

a left jog and a right jog both oriented at a forty-five degree upward angle, each of said jogs emanating at the midpoint of the respective left finger and right finger; and a left tip and a right tip, each corresponding to the opposite terminal ends of said rod.

4. A grate device as in claim 3, further comprising flattened left and right tips, such as to provide for a left eyehole opening and a right eyehole opening drilled into said left and right tips, respectively, thereby allowing insertion of screws through said eyehole openings as a means for fastening said grate device to the body or support legs of a cooking apparatus.

5. A method for the retention and storage of a grill of the type utilized with a komado-style, cooking apparatus within a grate device attached to the body or support legs of said cooking apparatus, said method comprising the steps of providing a continuous, specified length, "L," of rod, having a diameter in the range of 3/16 to 3/8 inch;

starting at the midpoint of said rod, with said rod positioned in a horizontal orientation and at a location on said rod 0.15L left of said midpoint and at a location on said rod 0.15L right of said midpoint, forming a ninety degree downward corner bend at both locations, such that both said bends form left and right inclined segments, respectively, with said cross-member and both said inclined segments occupying a common first plane;

utilizing locations on said inclined segments, 0.075L from each said corner bend, forming an elbow bend in the range of a thirty to forty degree angle, whereby the planes encompassing each respective elbow bend are orthogonal to said first plane, and thereby form left and right lower arms, both lower arms occupying a common second plane, said second plane being inclined at a thirty-to-forty degree angle from said first plane;

beginning at locations on said left and right lower arms, 0.10L, from each said elbow bend, form a ninety degree outward bend in a direction away from each said elbow bend, said outward bends thereby forming a left wing segment and right wing segment, respectively, both said segments confined within said second plane;

starting at locations on said left wing and said right wing, 0.025L from each said outward bend, form a ninety degree upward bend, wherein both said upward bends form a left upper arm and a right upper arm, respectively, both said upper arms contained within said second plane;

beginning at locations on said upper arms, 0.075L from each upward bend, form a forty-five degree short bend oriented at forty-five degrees from said second plane with each of said short bends thereby forming a left finger and a right finger, respectively, each finger having a length of 0.0125L, with each finger culminating in a left tip and a right tip, respectively;

beginning at points midway of the length of said left finger and said right finger, form a left jog upward bend and a right jog upward bend, respectively, both jog bends oriented orthogonally to each other in a common plane;

utilizing pre-formed or drilled holes in the support legs of said cooking apparatus, inserting said left and right fingers into said holes; and upon removal of said grill, inserting said grill between the elbow bends of said grate device herein.

\* \* \* \* \*